United States Patent
Bates et al.

(10) Patent No.: US 6,654,791 B1
(45) Date of Patent: Nov. 25, 2003

(54) METHOD AND APPARATUS FOR PROCESSING ELECTRONIC MAIL USING AN IMPORTANCE INDICATOR

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/534,275

(22) Filed: Mar. 24, 2000

(51) Int. Cl.$^7$ .............................................. G06F 15/16
(52) U.S. Cl. ........................................ 709/207; 709/206
(58) Field of Search ................................ 709/103, 206, 709/207; 379/93

(56) References Cited

U.S. PATENT DOCUMENTS

| | | | | |
|---|---|---|---|---|
| 5,377,354 A | * | 12/1994 | Scannell et al. | 709/103 |
| 5,694,616 A | * | 12/1997 | Johnson et al. | 709/207 |
| 6,351,764 B1 | * | 2/2002 | Voticky et al. | 709/207 |
| 6,400,810 B1 | * | 6/2002 | Skladman et al. | 379/93.24 |
| 6,411,947 B1 | * | 6/2002 | Rice et al. | 706/47 |
| 6,442,593 B1 | * | 8/2002 | Wang et al. | 709/206 |
| 6,473,752 B1 | * | 10/2002 | Fleming, III | 707/4 |
| 6,496,853 B1 | * | 12/2002 | Klein | 709/206 |
| 6,532,489 B1 | * | 3/2003 | Merchant | 709/206 |

FOREIGN PATENT DOCUMENTS

| | | | | |
|---|---|---|---|---|
| WO | WO9964972 | * | 12/1999 | G06F/17/60 |

* cited by examiner

*Primary Examiner*—Ayaz Sheikh
*Assistant Examiner*—Christian LaForgia
(74) *Attorney, Agent, or Firm*—Moser, Patterson & Sheridan, LLP

(57) ABSTRACT

A method and apparatus for processing electronic mail (e-mail) using an importance indicator such that a user can clearly identify which mail is important and should be viewed immediately. The method applies a set of importance rules to each electronic mail message that is received to determine the importance of that particular electronic mail message. Control messages are used to identify e-mail messages that have been read by others and replied to by others. As such, if a particular message has been "handled" by another recipient of the message then the importance indicator is lowered for the non-responding recipient(s). In one embodiment, a recipient may nominate another recipient of a message to "handle" the message. When a nomination is made, a nomination control message is sent to the nominated user to cause the importance indicator to be the highest value for the message the user has been nominated to handle.

26 Claims, 6 Drawing Sheets

MESSAGING EXAMPLE

TIME

T1  Cary sends message to John - "Where's XX"
T2  Paul sends message to John and Cary - "Who's doing XX"
T3  John brings up his mail program and sees:

| Mail | | |
|---|---|---|
| Importance | From | Subject |
| ***** (5) | Cary | Where's XX |
| *** (2.5) | Paul | Who's doing XX |

T4  John opens Paul's message.
T5  Cary comes back and checks his mail and sees:

| Mail | | |
|---|---|---|
| Importance | From | Subject |
| ** (2) | Paul | Who's doing XX |

T6  John now replies to Paul's message.
T7  Cary's screen refreshes and looks like:

| Mail | | |
|---|---|---|
| Importance | From | Subject |
| ** (1.5) | Paul | Who's doing XX |

T8  Paul sends another message to Cary and John - "Who asked about X"

T9  John opens the above message and nominates Cary since talked to Mr. X.

T10 Cary comes back and checks his mail and sees:

| Mail | | |
|---|---|---|
| Importance | From | Subject |
| ** (1.5) | Paul | Who's doing XX |
| ***** (5) | Paul | Who asked about X |

FIG. 5

METHOD AND APPARATUS FOR PROCESSING ELECTRONIC MAIL USING AN IMPORTANCE INDICATOR

BACKGROUND OF THE DISCLOSURE

1. Field of the Invention

The invention relates to electronic mail systems and, more particularly, the invention relates to a method and apparatus for processing electronic mail within an electronic mail delivery system using an importance indicator.

2. Description of the Background Art

Electronic mail has found wide spread use for business and personal communications. For many people, electronic mail has become essential to fulfilling their communications requirements. However, this wide spread use has also raised a number of problems.

For example, in today's business environment, many people are overloaded with the amount of electronic mail (e-mail) that they receive on a daily or even hourly basis. When reviewing e-mail, many users simply look at the person who sent the e-mail and the subject line to conclude if they need to read the message immediately or if reading the message can be delayed. This assessment as to the importance of the e-mail often leads to mistaken assumptions about which e-mail messages are most important and, as such, the assumptions can cost a business valuable time.

Although "urgent" and "for your information" (FYI) attributes do exist in presently available electronic mail systems, these features are often under- or over-utilized. For example, some users routinely identify all their outgoing messages as urgent, while other users bombard recipients with FYI messages. Furthermore, when a user sees an urgent message, if they assume the message is primarily directed to someone else who also may have received the message, the user will not read the message immediately.

Therefore, a need exists in the art for a method and apparatus for processing electronic mail using an importance indicator.

SUMMARY OF THE INVENTION

The disadvantages associated with the prior art are overcome by a method and apparatus for processing electronic mail (e-mail) using an importance indicator such that a user can clearly identify which mail is important and should be viewed immediately. Specifically, one embodiment of the invention is a method of prioritizing electronic mail messages comprising receiving an electronic mail message and at least one associated control message, assigning an initial importance value to the received electronic mail message, updating the initial importance value with an updated importance value, where the updated importance value is determined using the at least one associated control message, and displaying the electronic mail message with the updated importance value.

Another embodiment of the invention provides a method of processing electronic mail comprising receiving an electronic mail message, manipulating the electronic mail message, and transmitting a control message to at least one other user to inform the at least one other user that the electronic mail message has been manipulated.

Another embodiment of the invention provides a signal-bearing medium containing a program that, when executed by one or more processors, performs steps of processing electronic mail. The steps comprises receiving an electronic mail message, manipulating the electronic mail message, and transmitting a control message to at least one other user to inform the at least one other user that the electronic mail message has been manipulated.

BRIEF DESCRIPTION OF THE DRAWINGS

The teachings of the present invention can be readily understood by considering the following detailed description in conjunction with the accompanying drawings, in which:

FIG. 5 depicts a timing diagram of an example of how messages are handled within the electronic mail processing system of the present invention.

To facilitate understanding, identical reference numerals have been used, where possible, to designate identical elements that are common to the figures.

DETAILED DESCRIPTION

Figure 1:
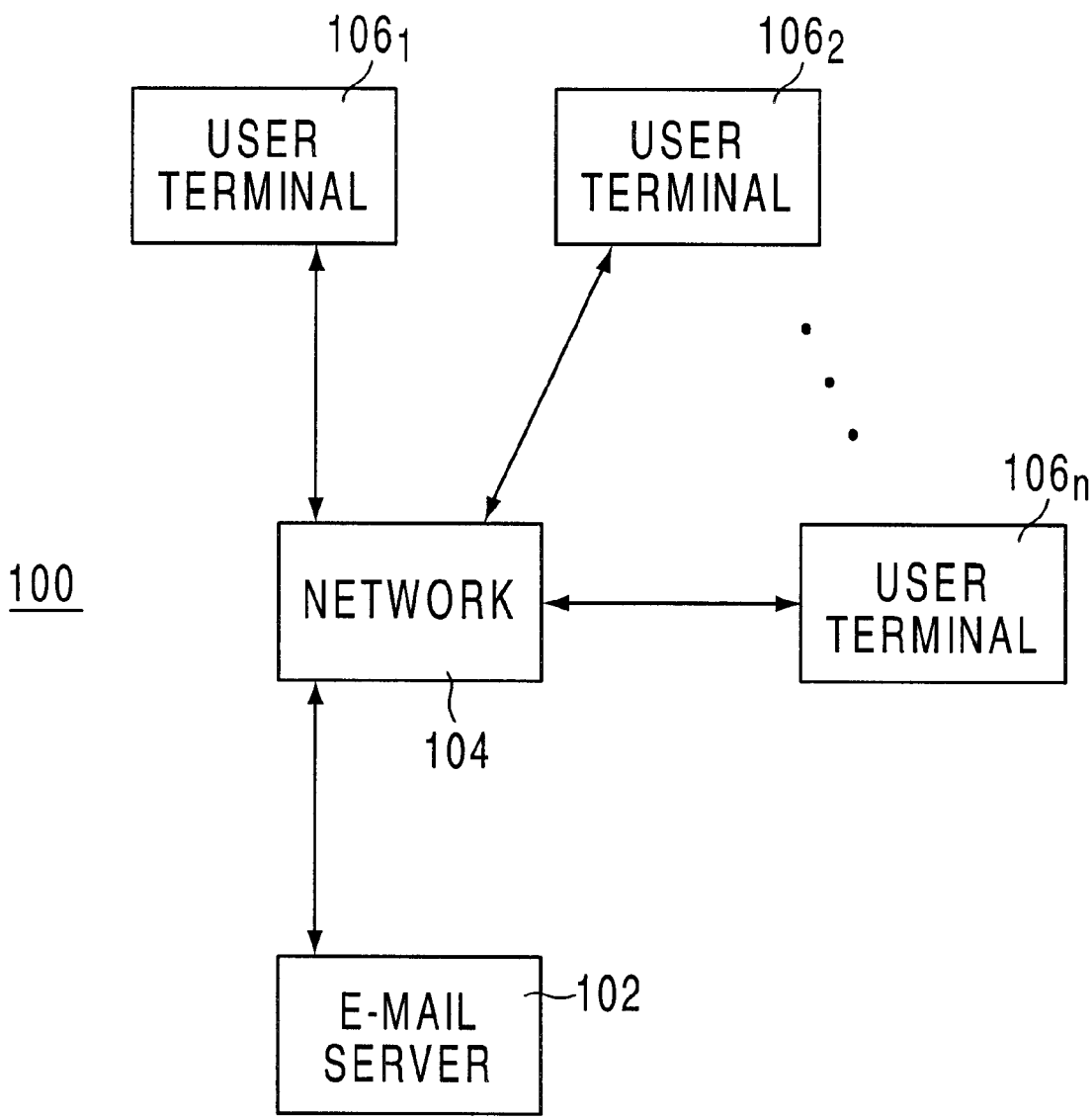
FIG. 1 depicts a simplified block diagram of an electronic mail system that benefits from the present invention.

FIG. 1 depicts an electronic mail (e-mail) system 100 that benefits by use of the present invention. The present invention is embodied as an executable software routine(s) that generally resides within the user terminals 106. The system 100 comprises an e-mail server 102, a network 104 and a plurality of user terminals $106_1$, $106_2$, . . . $106_n$. The user terminals 106 are connected to one another through the network 104 and also connected through the network 104 to the e-mail server 102. Although a hub-and-spoke network arrangement is depicted, the invention is useful for e-mail distribution in other forms of networks, e.g., token-ring and the like. Additionally, the functions of the e-mail server 102 may be distributed amongst one or mare servers that facilitate e-mail distribution.

The e-mail server 102 provides e-mail services to all of the user terminals 106 such that e-mail addressed from one terminal to another is routed through the network 104 to the e-mail server 102. The e-mail server 102 then properly addresses the e-mail to an appropriate user terminal 106. In addition to conventional e-mail messages, the system 100 routes control messages to the user terminals 106. These control messages, as described in detail below, facilitate dynamic use of an importance indicator value that is associated with each e-mail message. In one embodiment, the control messages are handled and routed by the system 100 in the same manner as conventional e-mail. The routines within each user terminal are designed to provide special processing for the control messages when received.

Figure 2:
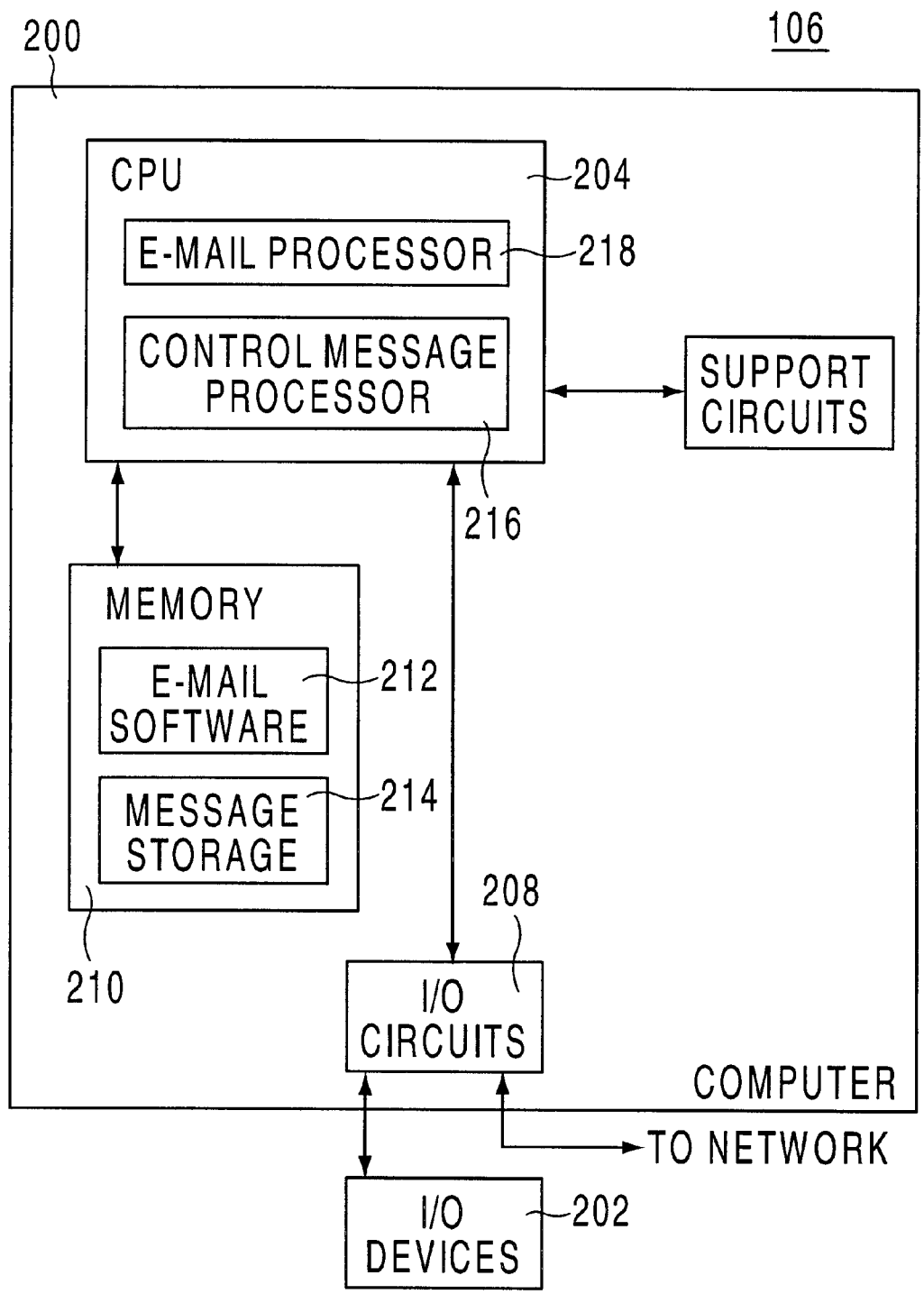
FIG. 2 depicts a simplified block diagram of a user terminal (computer) within the electronic mail system of FIG. 1.

FIG. 2 depicts a user terminal 106, e.g., a general purpose computer. User terminal 106 comprises a computer 200 and an input/output device or devices 202 such as a monitor, a keyboard, a mouse, a trackball and the like. The computer 200 comprises a central processing unit 204, support circuits 206, input/output circuits 208 and a memory 210. The memory 210 may be a solid state memory, a disc drive, an optical memory, a removable memory device, or a combination of any of these memory devices. The input/output"

circuits 208 provide a well-known interface from the CPU 204 to the I/O devices 202. The support circuits 206 are well known in the art and include such circuits as cache, power supplies, clock circuits, and the like. The combination of all of these circuits and elements forms a general purpose computer that, when executing a particular software package or routine, becomes a specific purpose computer. In this case, the CPU 204 when executing the electronic mail processing software 212 of the present invention becomes an e-mail processor 218 as well as a control message processor 216. The e-mail software 212 resides in memory 210. In addition, the electronic mail messages 214 including the control messages 214 are stored in a message storage 214 within the memory 210. In addition, the I/O circuits 208 generally contain a network interface card or modem that couples the computer to the network of FIG. 1 such that electronic mail messages can be routed to and from the computer 200.

As will be described in detail below, one embodiment of the invention is implemented as a program product for use with a computer system such as, for example, the computer 200 shown in FIG. 2. The program(s) of the program product defines functions of the preferred embodiment and can be contained on a variety of signal-bearing media, which include, but are not limited to, (i) information permanently stored on non-writable storage media, (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network including wireless communications. Such signal-bearing media, when carrying computer-readable instructions that direct the functions of the present invention, represent embodiments of the present invention.

In one embodiment, the invention is embodied in software that, when executed, forms the e-mail processor 218 and the control message processor 216. The processors 216, 218 operate to receive e-mail messages and control messages, process the messages, and display a list of e-mail messages where each message is displayed along with an importance indicator value. The control message processor 216 operates to analyze received control messages to determine the importance of a particular e-mail message. In one embodiment, there are three types of control messages that can be associated with an e-mail message, i.e., a read control message, a reply control message and a nominate control message. In addition, an analysis of the e-mail message header itself can be performed to initially assign an importance to an e-mail message even if no control messages are used. For example, if an e-mail message is sent from user A to users B and C, and the e-mail message is carbon copied (cc) to users D and E, and is blind carbon copied (bcc) to user F, the recipient information is analyzed to initially assign an importance indicator value to the e-mail message.

To assign the value, the invention applies a set of importance evaluation rules such as:

1) If there is only one recipient in the "To:" field, then assign a high importance to the message because only that one recipient can respond.
2) Reduce the importance value in accordance with the number of recipients in the "To:" field, i.e., the more recipients there are to respond to the message, the less important the message is to any one particular recipient.
3) If the recipient is in the "cc:" field, assign a lower importance because presumably a recipient in the "To:" field will respond to the message.
4) If the recipient is in the "bcc:" field, assign the lowest importance or an importance value that is user defined.
5) Apply other rules depending on the application.

The initial importance indicator value is then updated via the control message processor 216. When a recipient reads a message, a "read" control message is sent to all the recipients of the original e-mail message to indicate that someone has read the message. Also, when a recipient replies to a message, a "reply" control message is sent to all the recipients to indicate that someone has replied to that message. The control message processor, as described below, analyzes these control messages to update the importance of the message. In one embodiment, a recipient may nominate another recipient to respond to the e-mail message. Upon nominating another, the control message processor sends a nominate control message to the nominated recipient. The e-mail message of the nominated recipient is then given the highest importance.

The importance of an e-mail can be identified as a numerical value, a "star" rating system, colored highlighting of the e-mail messages in a list, special icons to indicate importance or nomination and the like. The importance indicator value will change as recipients read and respond to e-mail messages such that a dynamic importance valuation indicator is displayed. As such, users can quickly identify e-mail messages that must be responded to immediately.

Figure 3A:
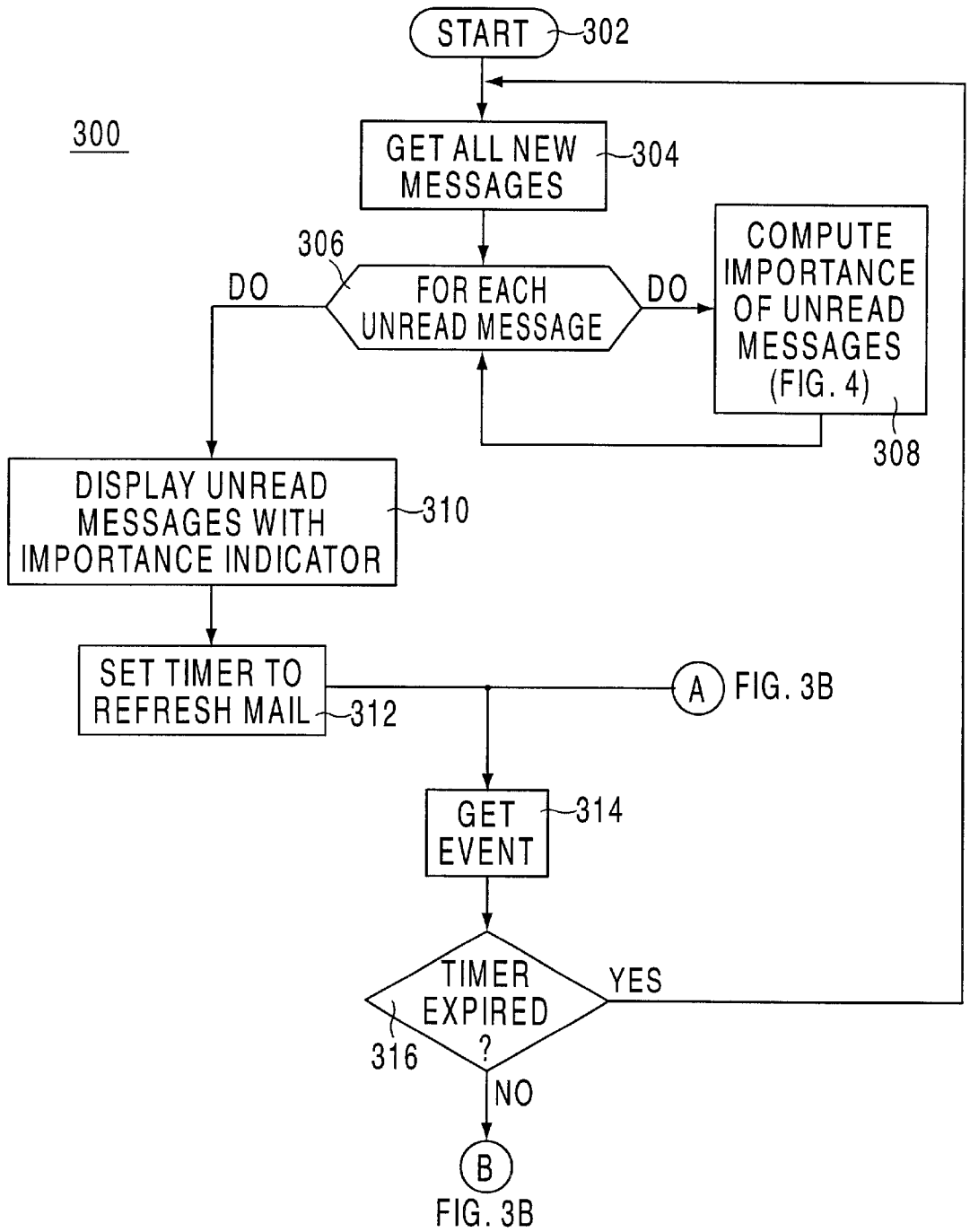
FIGS. 3A and 3B depict a flow diagram of the e-mail processing routine of the present invention.
Figure 3B:
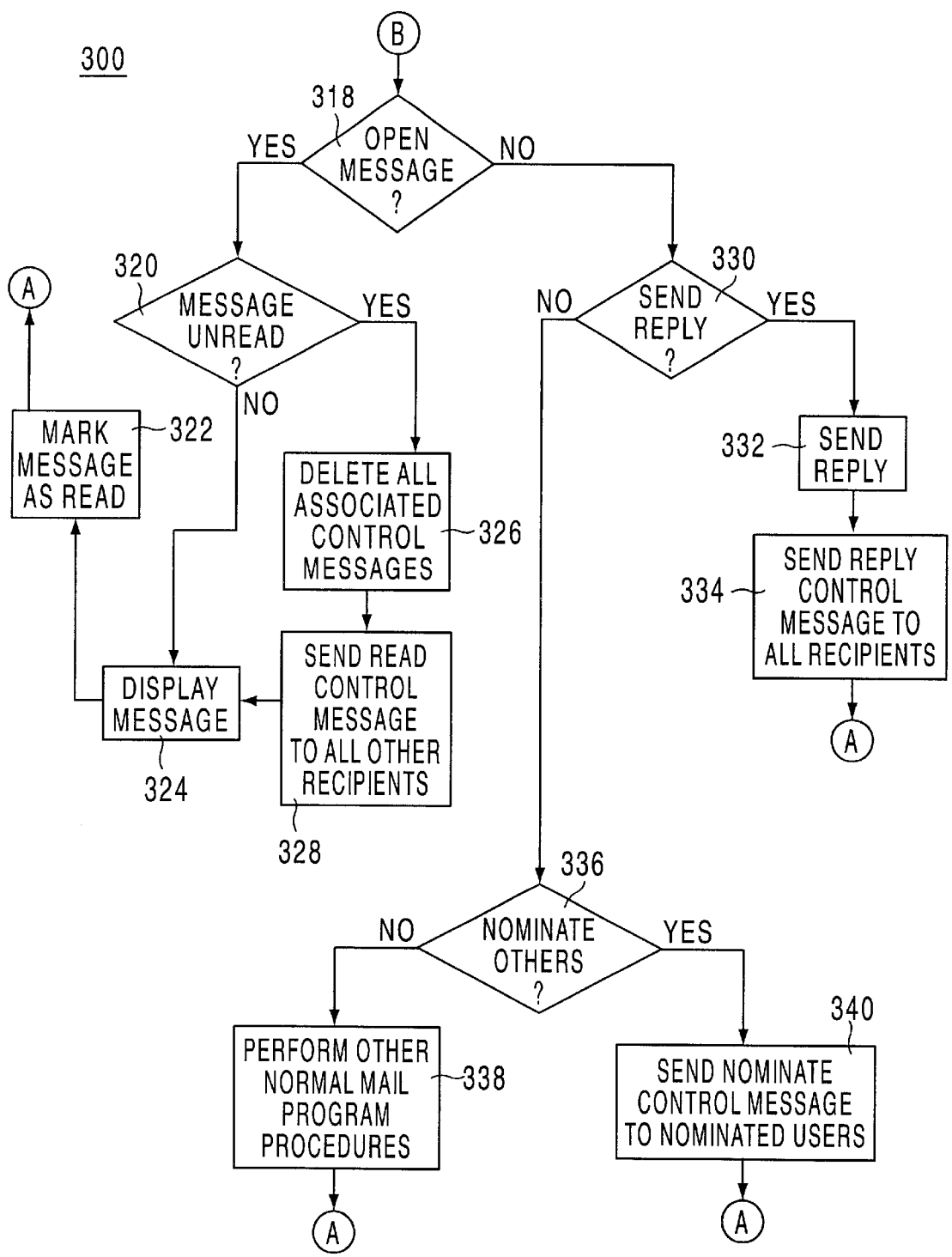

FIGS. 3A and 3B taken together depict a flow diagram of an electronic mail processing method 300 of the present invention. The method 300 begins at step 302 and proceeds to step 304 wherein all new messages addressed to a particular user are retrieved from the mail server 102. These messages include both e-mail messages and control messages. At step 306, for each unread message, an importance indicator value is computed in step 308. The process for computing the importance indicator is described below with reference to FIG. 4. Once the importance indicator value has been computed, the method 300 proceeds to step 310 wherein the unread messages are displayed along with the importance indicator that was computed in step 308. As such, each unread message in the display is associated with an importance indicator, e.g., a numerical value, a highlighting color and the like. At step 312, a timer is set to refresh the mail on a periodic basis. At step 314, an event occurs that causes the electronic mail processing method 300 to perform a number of further steps. The particular step performed depends upon the event that occurs. These events include the timer expiring, a message has been opened, a reply has been requested, or some other user is to be nominated to answer a particular unread electronic mail message.

At step 316, when the timer expires, the method returns to step 304 and retrieves all new messages that have been addressed to the user. If the timer has not yet expired, the method 300 proceeds to step 318. The query at step 318 queries whether an unread message should be opened. If the message is to be opened, the method proceeds to step 320 where another query requests whether the message that is to be opened is unread. If the message is a previously read message, then the message is simply displayed to the user at step 324. If the message has not been read, the procedure proceeds from step 320 to step 326 wherein all associated control messages that are locally associated with this unread message are deleted. Thereafter, at step 328, the process 300 sends a read control message to all other recipients of the unread message. In this manner all recipients including those listed in the "To:" field, the "cc:" field or the "bcc:" field of the original message are all notified that a particular user has read the message that was sent. In alternative embodiments of the invention, the read control messages may only be sent to recipients of selected fields. For example, recipients that are listed in the "To:" field of the original message or the "To:" and "cc:" fields. After the control messages are sent, the process displays the unread message on the screen to the user at step 324. At step 322, the message is marked as read and the process returns to step 314 to await another event.

If, at step 318, the message is not to be opened but rather either a reply is to be sent (whether the message is opened or not) or another person is to be nominated to answer the message, then the procedure moves from step 318 to step 330. At step 330, the process 300 queries whether a reply is to be sent to the current e-mail message. If a reply is to be sent, the user prepares and sends the reply at step 332 and, at step 334, the process sends reply control messages to all recipients of the original message. The reply control message operates to alter the priority indicator of the e-mail messages of other recipients as is appropriate. In this manner, all recipients of the message will be informed that a particular user has replied to the electronic mail message. In one embodiment, the user sending the reply may elect not to have the importance indicators of other recipients updated, i.e., the transmission of a reply control message is blocked. Once the control messages have been sent, the method 300 returns to step 314 to await the next event.

If users are to be nominated to reply to the e-mail message, at step 336, the method 300 proceeds to step 340 where the user may identify a particular user within the recipient's field of the e-mail message as the person who is best qualified to reply to that particular electronic mail message. In response to this nominee identification, the system sends, at step 340, a nominate control message to the nominated user or users to inform them that they have been nominated to reply to that particular e-mail message. Alternatively, the nominate control message may be sent to all the recipients such that the nominated recipient's e-mail message receives increased importance and that e-mail message of the not nominated recipients is given a lower importance. Thereafter, the method proceeds to step 314 to await another event. If a user is not to be nominated in step 336, the method proceeds to step 338 wherein various other normal electronic mail program procedures may be performed. Thereafter, the method 300 will return to step 314 to await another event.

Figure 4:
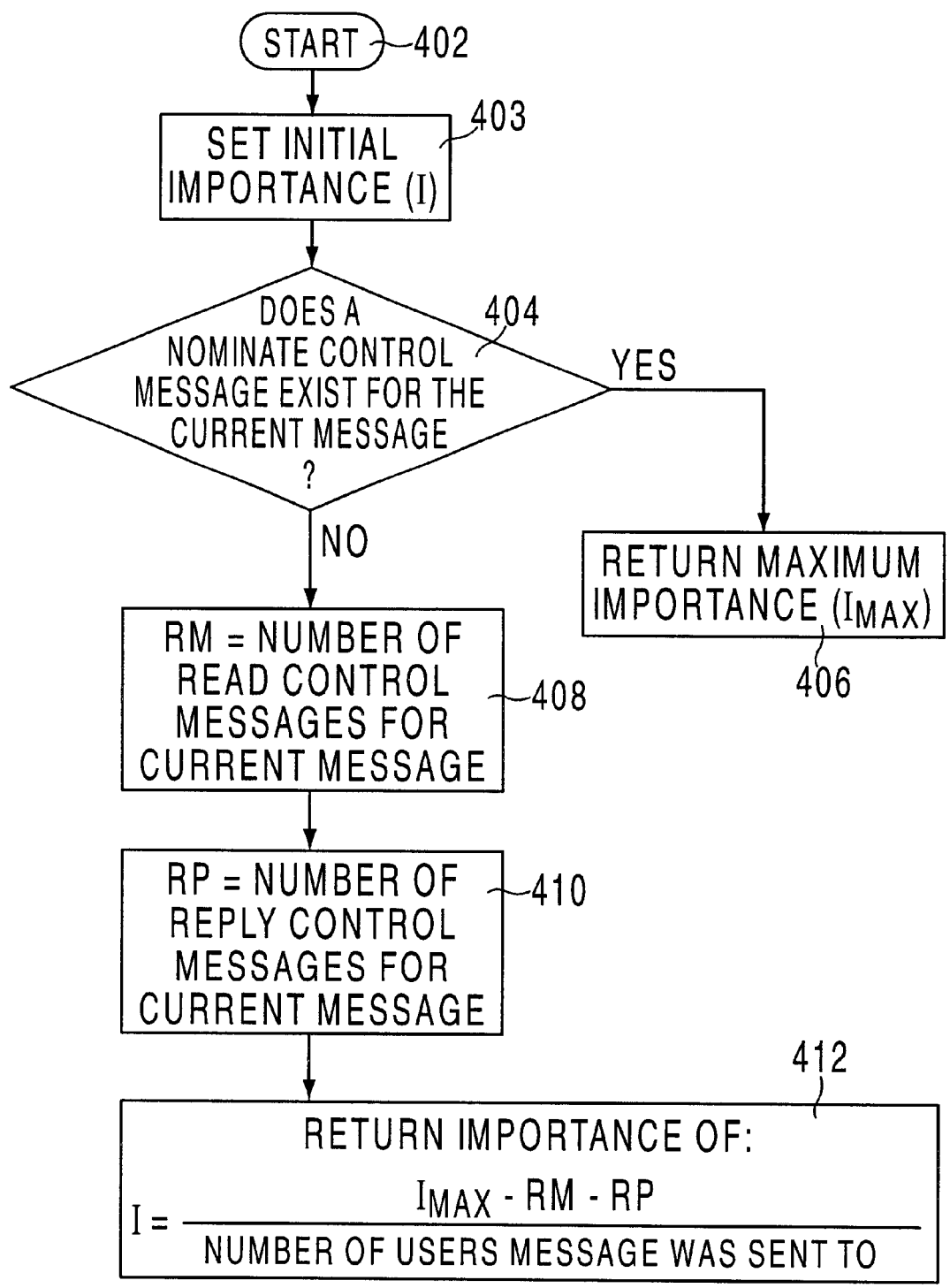
FIG. 4 depicts a flow diagram of a method for computing an importance indicator value for an unread electronic mail message.

FIG. 4 depicts a flow diagram of step 308 wherein the method 300 computes an importance indicator for a particular electronic mail message. The method 308 is entered at step 402 and proceeds to step 403. At step 403, the method 308 applies the rules discussed above for assigning an initial importance to each e-mail message. This assignment is generally accomplished based on the recipient information of the e-mail messages, but may be performed using any criteria, i.e., location of the sender, user defined values and criteria, and so on. At step 404, the method queries whether a nominate control message exists for the current message. The process 308 is repeated for every message in the unread messages list that has just been loaded into the system in step 304.

If a message in the list has been identified as having a nominate control message associated with it, then, at step 406, the process 308 returns a maximum importance value indicator ($I_{max}$) that identifies that particular e-mail message as a most important e-mail message. As such, that e-mail message, where the user has been identified as the important person to reply to that message, will be highlighted or otherwise identified with an importance indicator that identifies it as having maximum importance.

Alternatively, the nominate control message is sent to all recipients with a particular recipient identified as the nominee. Then the nominee's e-mail message importance value is raised to the highest level and the e-mail message of those recipients that were not nominated is given a lesser importance value. In lieu of the nominate control message containing the nominee's identification, a special control message can be sent to recipients of the e-mail message to indicate that they have not been nominated and the importance value for the related e-mail message can be lowered.

If a nominate control message does not exist, then the method proceeds from step 404 to step 408 wherein the number of read control messages that are associated with the current message are summed and at step 410 the number of reply control messages for that particular message are also summed. At step 412, the method returns an importance indicator value that is computed by subtracting the number of reply control messages and the number of read control messages from the maximum importance indicator value divided by the total number of recipients that received the unread message i.e., the lesser the number of recipients the higher the importance to those that did receive the e-mail message. The importance value computation is represented as:

$$I = \frac{I_{MAX} - RM - RP}{\text{Numbers of Users the Message Was Sent}}$$

where:

$I_{MAX}$ is the maximum importance value;

RM is the number of read control messages for the current message; and

RP is the number of reply control messages for the current message.

Each unread message is then associated with an importance value computed in this manner that enables the user to quickly identify which messages are the most important in the list of unread messages.

FIG. 5 depicts a messaging example that illustrates the operation of the present invention. At time T1, Cary sends a message to John asking "Where's XX." At time T2, Paul sends a message to John and Cary requesting "Who's doing XX." At time T3, John opens his mail program and sees a mail-log window 500. This window 500 identifies Cary's e-mail message with an importance of 5 (five stars and a numerical value of 5), the maximum value, and also identifies the subject as "Where's XX." The importance is 5 because John is the only recipient in the "To:" field of the message. Paul's message is given an importance indicator of three stars or a value of 2.5 for the subject "Who's doing XX." This occurs because Paul has sent messages to both John and Cary which means that the message is half as important as a message that is directed to a single individual such as John or Cary.

At T4, John opens Paul's message. A read control message is sent to Cary to update the importance of the message from John. At T5, Cary returns and checks his electronic mail as shown in window 502. The importance indicator is 2 for the message from Paul with the subject "Who's doing XX" because this message has been read by John and is now less important to be read by Cary. At time T6, John now replies to Paul's message and a reply control message is sent to Cary. Upon the reply being sent, Cary's mail-log screen refreshes to become window 504, wherein the importance value has two stars but an absolute value of 1.5 for the message from Paul having the subject "Who's doing XX."

At time T8, Paul sends another message to Cary and John requesting "Who asked about X." At time T9, John opens the above message and nominates Cary to respond since Cary had talked to Mr. X. When Cary returns at time T10 and checks his electronic mail, he sees mail-log window 506 that still contains the message from Paul having an importance value of 1.5, but also receives the second message from Paul where he was nominated by John to respond. This message is given the highest importance value of 5.

The technique of the present invention can be modified to accommodate various e-mail scenarios. For example, the system can be set to auto-nominate such that if a user is unavailable, e.g., vacationing, and receives a nomination, the system can automatically pass a received nomination to another person in the recipient's list to ensure that someone responds to the message.

While the foregoing is directed to the preferred embodiment of the present invention, other and further embodiments of the invention may be devised without departing from the basic scope thereof, and the scope thereof is determined by the claims that follow.

What is claimed is:

1. A method, implemented by a computer, of prioritizing electronic mail messages comprising:

receiving an electronic mail message and at least one associated control message;

assigning an initial importance value to the received electronic mail message;

updating the initial importance value with an updated importance value, where the updated importance value is determined using the at least one associated control message;

displaying the electronic mail message with the updated importance value; and, sending a read control message to at least one recipient listed in a recipient's field of the electronic mail message when the message is read, the read control message being configured to affect an importance value associated with an instance of the electronic mail message received by the at least one recipient.

2. The method of claim 1 wherein the assigning step further comprises:

identifying whether a recipient is in a particular recipient's field in the electronic mail message; and determining the initial importance value depending upon the particular recipient's field information.

3. The method of claim 1 wherein the control messages comprise an indicia of a response to an electronic mail message.

4. The method of claim 1 wherein the control messages comprise at least one of a read control message to indicate that a recipient of the electronic mail message has read the electronic mail message and a reply control message to indicate that a recipient of the electronic mail message has replied to the electronic mail message.

5. The method of claim 4 wherein the updating step further comprises:

determining a first number of read control messages associated with a particular electronic mail message;

determining a second number of reply control messages associated with a particular electronic mail message;

determining a third number of recipients of the electronic mail message; and using the first, second and third numbers to compute an updated importance value.

6. The method of claim 1 wherein the control message is a nominate control message that identifies a particular user as responsible to respond to the electronic mail message.

7. The method of claim 6 wherein the updated importance value is a highest importance value when a nominate control message is associated with an electronic mail message.

8. A method, implemented by a computer, of prioritizing electronic mail message comprising:

receiving an electronic mail message;

analyzing recipient information contained in the electronic mail message;

assigning an importance value to the received electronic mail message in response to the analysis of the recipient information;

receiving a control message from at least one recipient listed in a recipient's field of the electronic mail message when the message is read by another recipient, the control message being configured to affect the importance value associated with the electronic mail message;

updating the initial importance value with an updated importance value, wherein the updated importance value is determined using the at least one associated control message; and displaying the electronic mail message with the importance value.

9. The method of claim 8 wherein analyzing step further comprises: identifying a number of recipients in a TO: field of the electronic mail message.

10. The method of claim 8 wherein analyzing step further comprises: identifying a number of recipients in a CC: field of the electronic mail message.

11. The method of claim 8 wherein analyzing step further comprises: identifying a number of recipients in a BCC: field of the electronic mail message.

12. A computer readable medium storing a software program that, when executed by a computer, causes the computer to perform a method comprising:

receiving an electronic mail message;

analyzing recipient information contained in the electronic mail message;

assigning a value to an importance indicator to the received electronic mail message in response to the analysis of the recipient information; and dynamically changing the importance value in response to control messages indicating that at least one other instance of the electronic mail message has been manipulated by at least one other recipient, wherein the control message is configured to affect the importance value associated with the electronic mail message.

13. The method claim 12 further comprising:

sending a read control message to the at least one other recipient listed in a recipient's field of the electronic mail message when the message is read.

14. The method of claim 12 wherein the assigning step further comprises:

identifying whether a recipient is in a particular recipient's field in the electronic mail message; and determining the initial importance value depending upon the particular recipient's field information.

15. The method of claim 12 wherein the control messages comprise an indicia of a response to an electronic mail message.

16. The method of claim 12 wherein the control messages comprise at least one of a read control message to indicate that the at least one other recipient of the electronic mail message has read the electronic mail message and a reply control message to indicate that the at least one other recipient of the electronic mail message has replied to the electronic mail message.

17. The method of claim 12 wherein the control message is a nominate control message that identifies a particular recipient of the electronic mail message as responsible to respond to the electronic mail message.

18. A method, implemented by a computer, for indicating an importance of electronic mail messages, comprising:

receiving an e-mail message having a list of recipients;

assigning an initial importance value to the e-mail message;

receiving a control message indicating manipulation of at least one other instance of the e-mail message by at least one other recipient on the list of recipients, wherein the control message is configured to affect an importance value associated with the electronic mail message; and, updating the initial importance value of the e-mail message to an updated importance value on the basis of the control message.

19. The method of claim 18, wherein updating the initial importance value comprises reducing the initial importance value.

20. The method of claim 18, wherein the manipulation indicated by the control message includes opening the at least one other instance of the e-mail message by the at least one other recipient.

21. The method of claim 20, wherein updating the initial importance value comprises reducing the initial importance value.

22. The method of claim 21, wherein an initial value of the associated importance indication is based on a number of recipients in the list of recipients.

23. A method, implemented by a computer, for indicating an importance of electronic mail messages, comprising:

receiving an e-mail message having a list of recipients having an associated importance indication;

receiving a plurality of control messages each indicating manipulation of another instance of the e-mail message by other recipients on the list of recipients, wherein the control messages are configured to affect the importance indication associated with the electronic mail message; and, successively updating a value of the importance indication upon receipt of, and on the basis of, each individual control message.

24. The method of claim 23, wherein an initial value of the associated importance indication is based on a number of recipients in the list of recipients.

25. The method of claim 23, wherein updating the value of the importance indication comprises reducing the value.

26. The method of claim 23, wherein the manipulation indicated by a given control message includes opening the respective instance of the e-mail message by the respective recipient.

* * * * *